(12) United States Patent
Katabami

(10) Patent No.: US 9,946,503 B2
(45) Date of Patent: Apr. 17, 2018

(54) IMAGE DATA GENERATION DEVICE WITH RASTER IMAGE PROCESSOR

(71) Applicant: RISO KAGAKU CORPORATION, Tokyo (JP)

(72) Inventor: Hideki Katabami, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/070,636

(22) Filed: Mar. 15, 2016

(65) Prior Publication Data

US 2016/0274852 A1     Sep. 22, 2016

(30) Foreign Application Priority Data

Mar. 17, 2015   (JP) .................................. 2015-053294
Feb. 5, 2016    (JP) .................................. 2016-020887

(51) Int. Cl.
*G06F 3/12*     (2006.01)
*G06K 15/02*    (2006.01)
*G06K 15/16*    (2006.01)

(52) U.S. Cl.
CPC .......... *G06F 3/1296* (2013.01); *G06F 3/1213* (2013.01); *G06F 3/1232* (2013.01); *G06F 3/1282* (2013.01); *G06F 3/1286* (2013.01); *G06K 15/02* (2013.01); *G06K 15/16* (2013.01)

(58) Field of Classification Search
None
See application file for complete search history.

(56) References Cited

FOREIGN PATENT DOCUMENTS

| EP | 0945779 | 9/1999 | |
| EP | 0945779 A2 * | 9/1999 | ........... G06F 3/1297 |
| JP | 11-102095 | 4/1999 | |
| JP | 2001-175447 | 6/2001 | |
| JP | 2001175447 A * | 6/2001 | |
| JP | 4267398 | 5/2009 | |

OTHER PUBLICATIONS

Extended European Search Report for EP Application No. 16160870.8 dated Jul. 28, 2016.

* cited by examiner

*Primary Examiner* — Andrew H Lam
(74) *Attorney, Agent, or Firm* — Greenblum & Bernstein, P.L.C.

(57) ABSTRACT

There are provided: a tray information acquisition unit configured to acquire tray information indicating the size and direction of sheets stacked on a plurality of paper feed trays of a printing machine, and the number of remaining sheets; a number-of-pages calculator configured to calculate the number of print pages of the image data based on the print job; and a raster image processor configured to determine the direction of the image data based on the tray information and the number of print pages, and generate image data by performing a raster image processing.

4 Claims, 11 Drawing Sheets

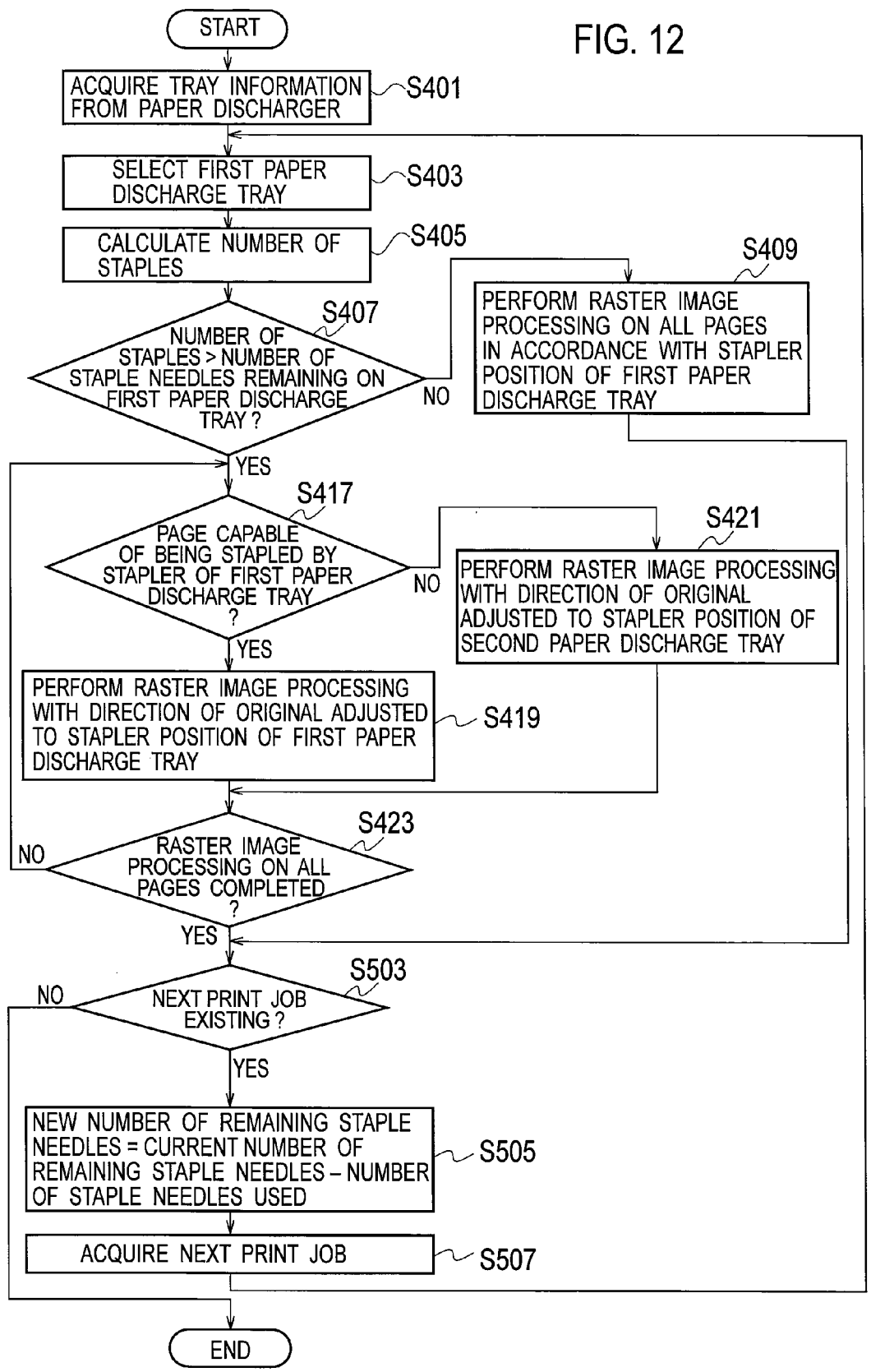

IMAGE DATA GENERATION DEVICE WITH RASTER IMAGE PROCESSOR

BACKGROUND

1. Technical Field

The present invention relates to an image data generation device that prevents decrease of printing speed even when continuing printing by switching paper feed trays and paper discharge trays during printing in a printing machine.

2. Related Art

Conventionally, an image data generation device generates image data required by a printing machine for printing by performing a Raster Image Processing (RIP) based on a print job. On paper feed trays of the printing machine, sheets of a plurality of sizes such as A4 and A3, or sheets having the same size but different directions, are placed, and the printing machine performs printing on the sheets while switching paper feed trays as appropriate based on the image data.

Therefore, Patent Document 1 discloses a technique relating to an image data generation device for performing an appropriate image generation process regardless of the direction of sheets being fed or the like.

The image data generation device stores image data generated by the raster image processing based on a print job; detects a paper feed state including the direction of sheets being fed or the like from a paper feed tray to an image generation unit; and, based on the detection result, selectively performs magnification, reduction, or rotation of the stored image data so as to adapt to the state of the image generation surface of the sheet being fed.

In addition, there are also printing machines having a stapling function for stapling printed and discharged sheets.

Patent Document 2 discloses a technique relating to an image forming device that forms an image on an A4 sheet, and performs a stapling process by a first stapler when the first stapler is determined to be capable of stapling, or forms an image rotated by 90° on an A4R sheet (a sheet at an angle of 90° relative to the A4 sheet) and performs the stapling process by a second stapler when the first stapler is determined to be incapable of stapling.

PRIOR ART DOCUMENT

Patent Document

Patent Document 1: Japanese Patent No. 4267398
Patent Document 2: Japanese Patent Application Laid-Open Publication No. 11-102095

SUMMARY

However, there occurs a problem with the image data generation device described in the aforementioned Patent Document 1 that printing speed decreases due to occurrence of rotation of image data in a case where the paper feed tray runs out of sheets being used for printing image data and the sheet direction is changed when the paper feed tray is switched to another one so as to continue printing.

In addition, there occurs a similar problem with the image forming device described in the aforementioned Patent Document 2 that printing speed decreases due to occurrence of rotation of image data in a case where the paper discharge tray being used runs out of needles of a first stapler and the position of stapling changes when the paper discharge tray is switched to another one having a second stapler so as to continue stapling.

Notably, the processing capacity of the processor of the printing machine is lower than that of a personal computer or the like, and therefore rotation of the image data takes time to decrease the printing speed when the amount of the image data is large because the image data to be printed is of high-resolution, the image data is color data, or the sheet size is large, for example.

The present invention has been made in view of the above problem. An object of the present invention is to provide an image data generation device capable of preventing decrease of printing speed even when continuing printing by switching paper feed trays and paper discharge trays during printing in a printing machine.

To achieve the aforementioned object, an image data generation device according to the present invention is an image data generation device that generates image data based on a print job, including:

a tray information acquisition unit configured to acquire tray information including at least a remaining number and a status of consumables used in each of a plurality of trays of a printing machine;

a number-of-consumables-used calculator configured to calculate the number of consumables used based on the print job; and a raster image processor configured to determine a tray to be used and a direction of the image data based on the tray information and the number of consumables used, and generate the image data by performing a raster image processing in the determined direction.

BRIEF DESCRIPTION OF DRAWINGS

The invention will now be described with reference to the accompanying drawings.

FIG. 12 is a flowchart illustrating the operation of the image data generator of a fifth embodiment of the image data generation device according to the present invention.

DETAILED DESCRIPTION

Embodiments of an image data generation device according to the present invention will be described below with reference to the drawings.

Although, in the plurality of embodiments described below, the image data generation device according to the present invention will be described as an image data generator provided in a printing machine, the present invention is not limited thereto, and the image data generation device may be provided in a terminal device or a device dedicated for a raster image processing. In addition, the plurality of embodiments described below is only an example of the present invention, and therefore the image data generation device according to the present invention is not limited to the plurality of embodiments described in the following.

First Embodiment

Configuration of Printing Apparatus 1 Having Image Data Generator 11

Figure 1:
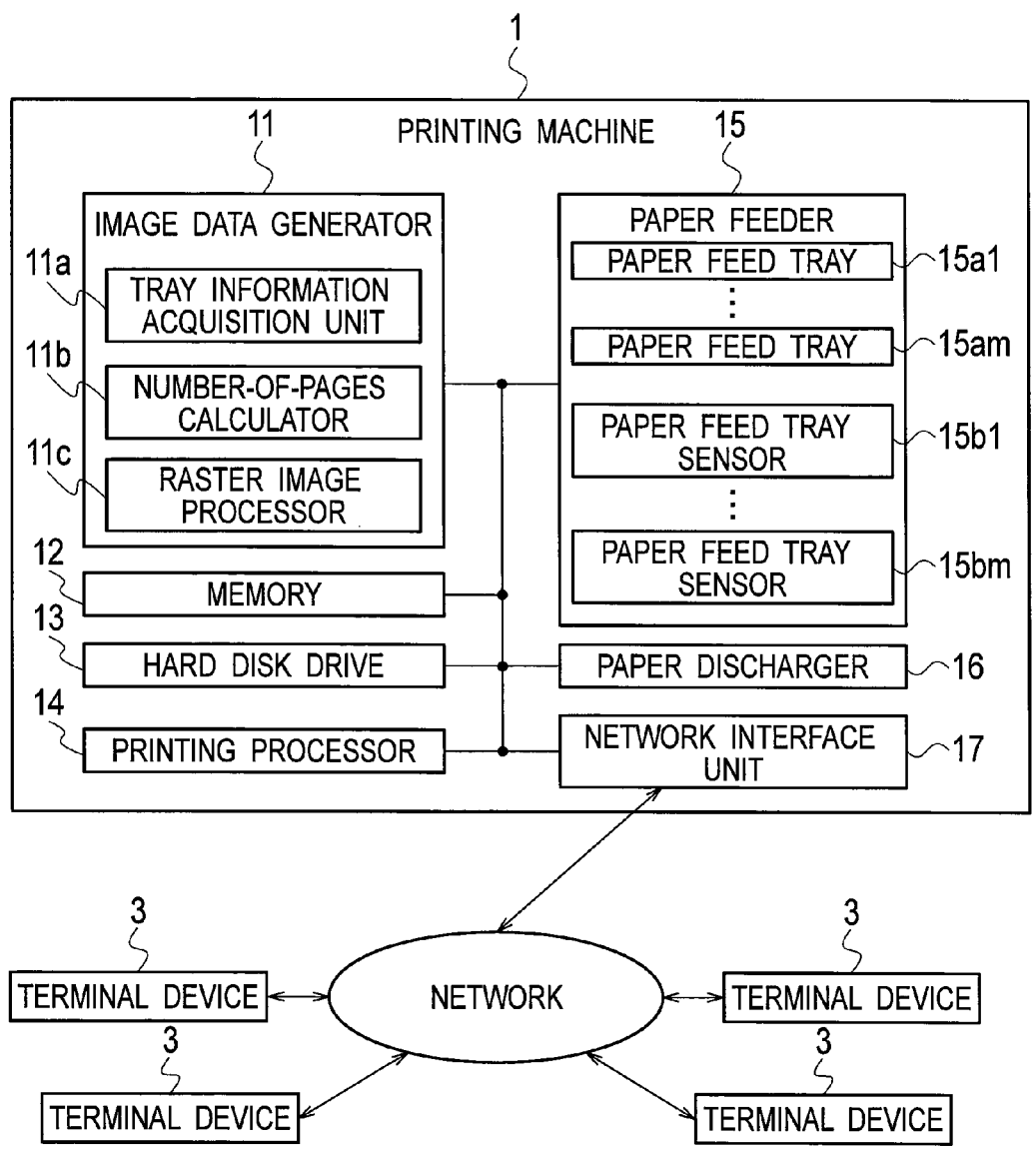
FIG. 1 is a block diagram illustrating an exemplary configuration and connection to a terminal device, of a printing machine having an image data generator of a first embodiment of an image data generation device according to the present invention.

FIG. 1 is a block diagram illustrating an exemplary configuration and connection to a terminal device 3, of a printing machine 1 having an image data generator 11 of a first embodiment of an image data generation device according to the present invention.

As illustrated in FIG. 1, the printing machine 1 having the image data generator 11 of the first embodiment of the image data generation device according to the present invention is connected to terminal devices 3, 3, . . . of respective users via a network 2 such as an intra-company network.

The printing machine 1 has the image data generator 11, a memory 12, a hard disk drive 13, a printing processor 14, a paper feeder 15, a paper discharger 16, a network interface unit 17, and the like.

The image data generator 11, which includes a CPU (not illustrated) and the like, executes a program such as a printer driver stored in the hard disk drive 13 so as to function as a tray information acquisition unit 11a, a number-of-pages calculator 11b (a number-of-consumables-used calculator), and a raster image processor 11c according to the present invention, and generate image data for printing based on a print job which has been transmitted from the terminal device 3 or the like.

The memory 12 temporarily stores a variety of information to be processed by the image data generator 11 and a variety of data of the print job or the like.

The hard disk drive 13 has stored therein the printer driver which causes the image data generator 11 to function as the tray information acquisition unit 11a, the number-of-pages calculator 11b, and the raster image processor 11c according to the present invention, as well as programs such as various application programs.

The printing processor 14 performs ink-jet, stencil, or a laser printing, based on image data which has been transmitted from the terminal device 3, or image data generated by the image data generator 11.

The paper feeder 15, which has a plurality of (here, assumed to be m (a natural number of 2 or more), for example) paper feed trays 15a1 to 15am having stacked thereon sheets of various sizes such as A4 or A3, and paper feed tray sensors 15b to 15bm and the like configured to detect the sheet direction and the number of sheets remaining on the paper feed trays 15a1 to 15am, feeds sheets of respective sizes from the paper feed trays 15a1 to 15am to the printing processor 14 "horizontally (long-side feed)" or "vertically (short-side feed)".

The paper discharger 16 discharges sheets which have been printed by the printing processor 14.

The network interface unit 17 is connected to each of the terminal devices 3, 3, . . . via the network 2.

The terminal device 3, which is a PC or the like configured to perform a variety of information processing, transmits print jobs to the printing machine 1 via the network 2.

<Operation of Image Data Generator 11 of First Embodiment>

Next, an operation of the image data generator 11 of the first embodiment of the image data generation device according to the present invention configured as above will be described, referring to the drawings.

Figure 2:
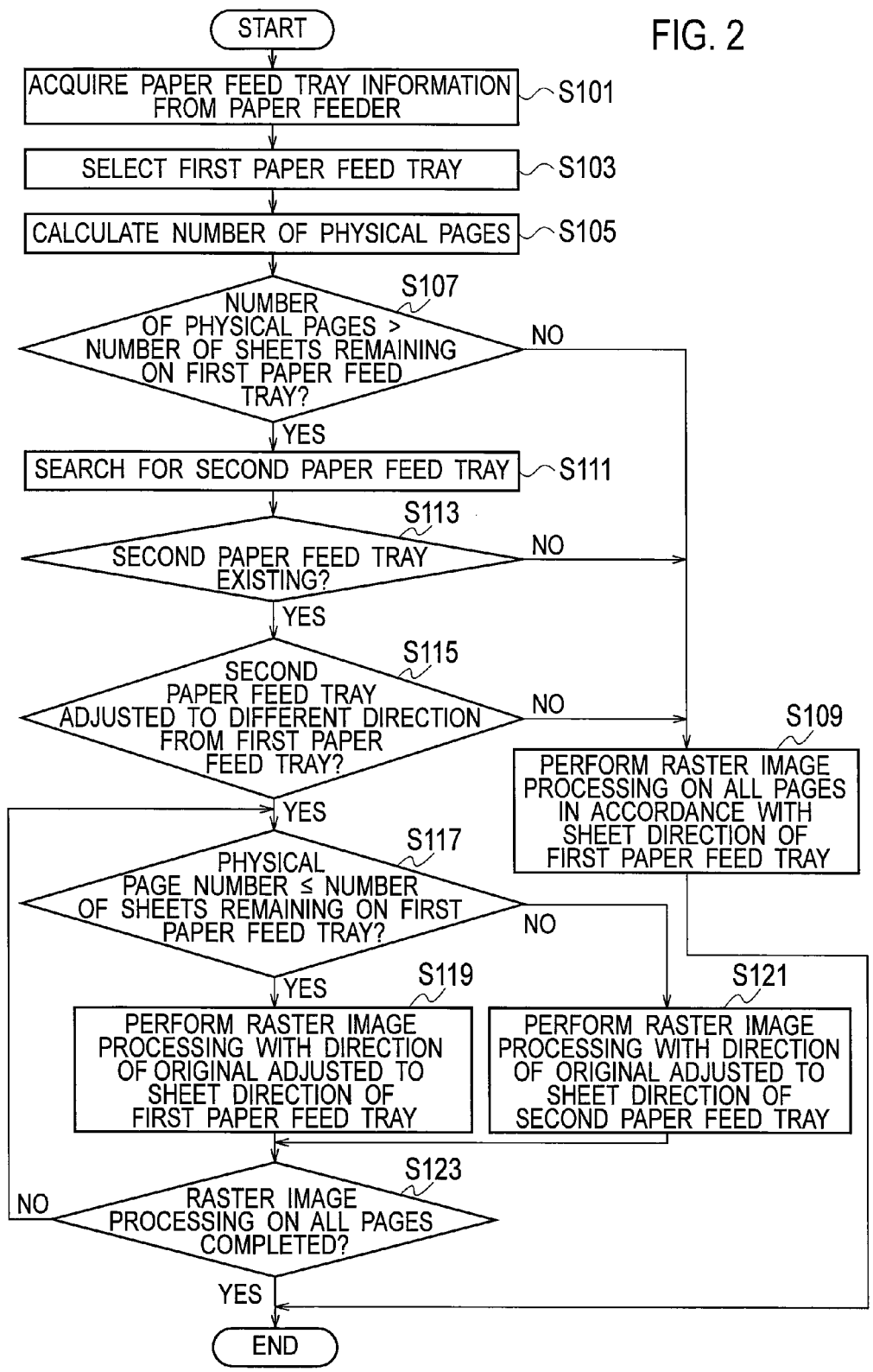
FIG. 2 is a flowchart illustrating the operation of the image data generator of the first embodiment of the image data generation device according to the present invention.

FIG. 2 is a flowchart illustrating the operation of the image data generator 11 of the first embodiment of the image data generation device according to the present invention.

First, the printing machine 1 starts operating upon receiving a print job from a certain terminal device 3 via the network 2, for example, and the tray information acquisition unit 11a of the image data generator 11 first acquires paper feed tray information (tray information) of the respective paper feed trays 15a1 to 15am from the respective paper feed tray sensors 15b1 to 15bm of the paper feeder 15 (step S101).

The paper feed tray information including information such as sheet size or sheet direction (a status of consumables), number of remaining sheets, or the like, is acquired from the respective paper feed tray sensors 15b1 to 15bm provided in the respective paper feed trays 15a1 to 15am. However, the paper feed tray information may be stored in, and acquired from, the memory 12 or the like. In addition, the status of consumables includes information such as sheet size or sheet direction. The sheet direction information may be omitted since the sheet direction is recognizable from the verticality or horizontality indicated in the sheet size information.

Next, the raster image processor 11c of the image data generator 11 selects, from the information of the respective paper feed trays 15a1 to 15am, a first paper feed tray which is the paper feed tray specified in the print job (step S103), and subsequently calculates the number of physical pages of the image data from the print job received from the terminal device 3 by the number-of-pages calculator 11b of the image data generator 11 (step S105). Here, the number of physical pages is the number of pages (number of sheets) of the sheets when the image data is printed.

Next, the raster image processor 11c of the image data generator 11 determines whether or not the number of physical pages of the image data is larger than the number of sheets remaining on the first paper feed tray (step S107) and, when it is determined that the number of physical pages of the image data is not larger than the number of sheets remaining on the first paper feed tray (NO at step S107), the raster image processor 11c performs a raster image processing on all the pages in the print job and generates the image data in accordance with the sheet direction of the first paper feed tray (step S109).

When, on the other hand, it is determined that the number of physical pages of the image data is larger than the number of sheets remaining on the first paper feed tray (YES at step S107), the raster image processor 11c searches for a second paper feed tray based on the paper feed tray information (step S111). The second paper feed tray is, among the respective paper feed trays 15a1 to 15am, a paper feed tray having the same sheet size as that of the first paper feed tray.

Subsequently, when it is determined that there is no second paper feed tray (NO at step S113), which indicates that there is no paper feed tray having the same sheet size as that of the first paper feed tray, the raster image processor 11c performs the raster image processing on all the pages in the print job and generates the image data in accordance with the sheet direction of the first paper feed tray (step S109), similarly to the case where it has been determined at step S107 (NO) that the number of physical pages of the image data is not larger than the number of sheets remaining on the first paper feed tray.

When, on the other hand, it is determined that there exists a second paper feed tray (YES at step S113), the raster image processor 11c subsequently determines whether or not the second paper feed tray has a sheet direction different from that of the first paper feed tray (step S115).

Here, when the second paper feed tray has the same sheet direction as that of the first paper feed tray (NO at step S115), it turns out that the second paper feed tray has stacked thereon sheets of the same size and the same direction as those of the first paper feed tray. Therefore, the raster image processor 11c performs the raster image processing on all the pages in the print job and generates the image data in accordance with the sheet direction of the first paper feed tray (step S109), similarly to the case where it has been determined at step S107 (NO) that the number of physical pages of the image data is not larger than the number of sheets remaining on the first paper feed tray.

When, on the other hand, the second paper feed tray has a sheet direction different from that of the first paper feed tray (YES at step S115), the raster image processor 11c further determines (step S117) whether or not the physical page number of the image data subjected to the raster image processing is not larger than the number of sheets remaining on the first paper feed tray while the raster image processor 11c performs the raster image processing on all the pages in the print job (NO at step S123). A physical page number of image data is a number added from the first page (first sheet) for each number of physical pages of image data generated by the raster image processing.

Here, when the physical page number of the image data generated by the raster image processing is not larger than the number of sheets remaining on the first paper feed tray (YES at step S117), which indicates that the page of image data of the physical page number is printable on sheets from the first paper feed tray specified by the user in the print job, the raster image processor 11c performs the raster image processing and generates image data with the direction of the original of the physical page number adjusted to the sheet direction of the first paper feed tray (step S119).

When, on the other hand, the physical page number of the image data generated by the raster image processing has become larger than the number of sheets remaining on the first paper feed tray (NO at step S117), it turns out that the physical page number and subsequent numbers exceed the number of sheets remaining on the first paper feed tray and therefore printing is impossible with the sheets remaining on the first paper feed tray. Accordingly, in such a case, the raster image processor 11c performs the raster image processing with the direction of the originals of the physical page number and subsequent numbers adjusted to the sheet direction of the second paper feed tray (step S121).

When the raster image processing on all the pages in the print job is completed (YES at step S123), the raster image processor 11c terminates the aforementioned processing.

Figure 3:
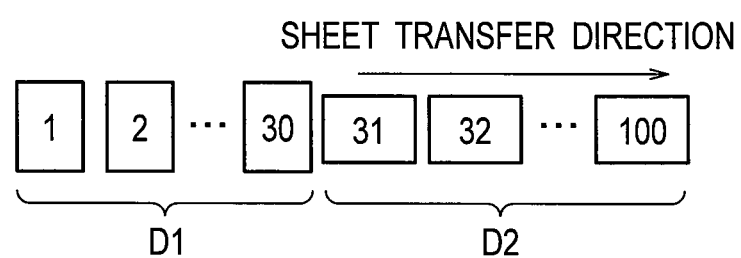
FIG. 3 illustrates a direction of image data generated by a raster image processing performed by the image data generator of the first embodiment of the image data generation device according to the present invention.

FIG. 3 is an explanatory drawing illustrating the direction of the image data after the raster image processing by the image data generator 11 of the first embodiment of the image data generation device according to the present invention.

FIG. 3 illustrates a case where a print job instructs printing of a 100-page stack of originals, i.e., originals of physical page numbers from page 1 to page 100, for example, with the sheet size of the first paper feed tray being "A4", the sheet direction being "horizontal (long-side feed)", and the number of remaining sheets being 30, for example. In addition, there is illustrated a case with the sheet size of the second paper feed tray being "A4", the sheet direction being "vertical (short-side feed)", and the number of remaining sheets being 500, for example.

Under the aforementioned conditions, therefore, the raster image processor 11c performs the raster image processing on originals of physical page numbers 1 to 30 "horizontally (long-side feed)", which is the sheet direction of the first paper feed tray specified by the user in the print job, and generates "horizontal (long-side feed)" image data D1 as illustrated in FIG. 3.

On the other hand, the raster image processor 11c performs the raster image processing "vertically (short-side feed)" on the remaining originals of the physical page numbers 30 to 100 of the print job, the raster image processing "vertically (short-side feed)" which is the sheet direction of the second paper feed tray so as to generate "vertical (short-side feed)" image data D2 as illustrated in FIG. 3.

Therefore, according to the image data generator 11 of the first embodiment of the image data generation device according to the present invention, when the number of print pages is larger than the number of sheets remaining on the first paper feed tray, the raster image processor 11c, after having performed the raster image processing and generated image data in the sheet direction of the first paper feed tray, performs the raster image processing and generates image data in the sheet direction of the second paper feed tray having stacked thereon sheets of the same size as the sheets stacked on the first paper feed tray.

Accordingly, rotation of image data when switching trays becomes unnecessary and decrease of printing speed can be prevented, even when the number of print pages is larger than the number of sheets remaining on the first paper feed tray specified in the print job, and printing is performed by switching from the first paper feed tray to the second paper feed tray which has a different sheet direction.

In other words, according to the image data generator 11 of the first embodiment of the image data generation device according to the present invention, the direction of image data is determined based on paper feed tray information of a plurality of paper feed trays of a printing machine and the number of print pages, and image data is generated by performing the raster image processing in the determined direction. Accordingly, decrease of printing speed can be prevented because rotation of the generated image data is unnecessary when switching trays, even in a case of continuing printing by switching to a paper feed tray having a different sheet direction during printing in a printing machine.

Second Embodiment

Next, the image data generator 11 of a second embodiment of the image data generation device according to the present invention will be described. The image data generator 11 of the second embodiment has the same configuration as that of the image data generator 11 of the first embodiment illustrated in FIG. 1, with only their operations being different, and therefore the operation of the second embodiment will be described referring to symbols of the image data generator 11 of the first embodiment illustrated in FIG. 1.

Figure 4:
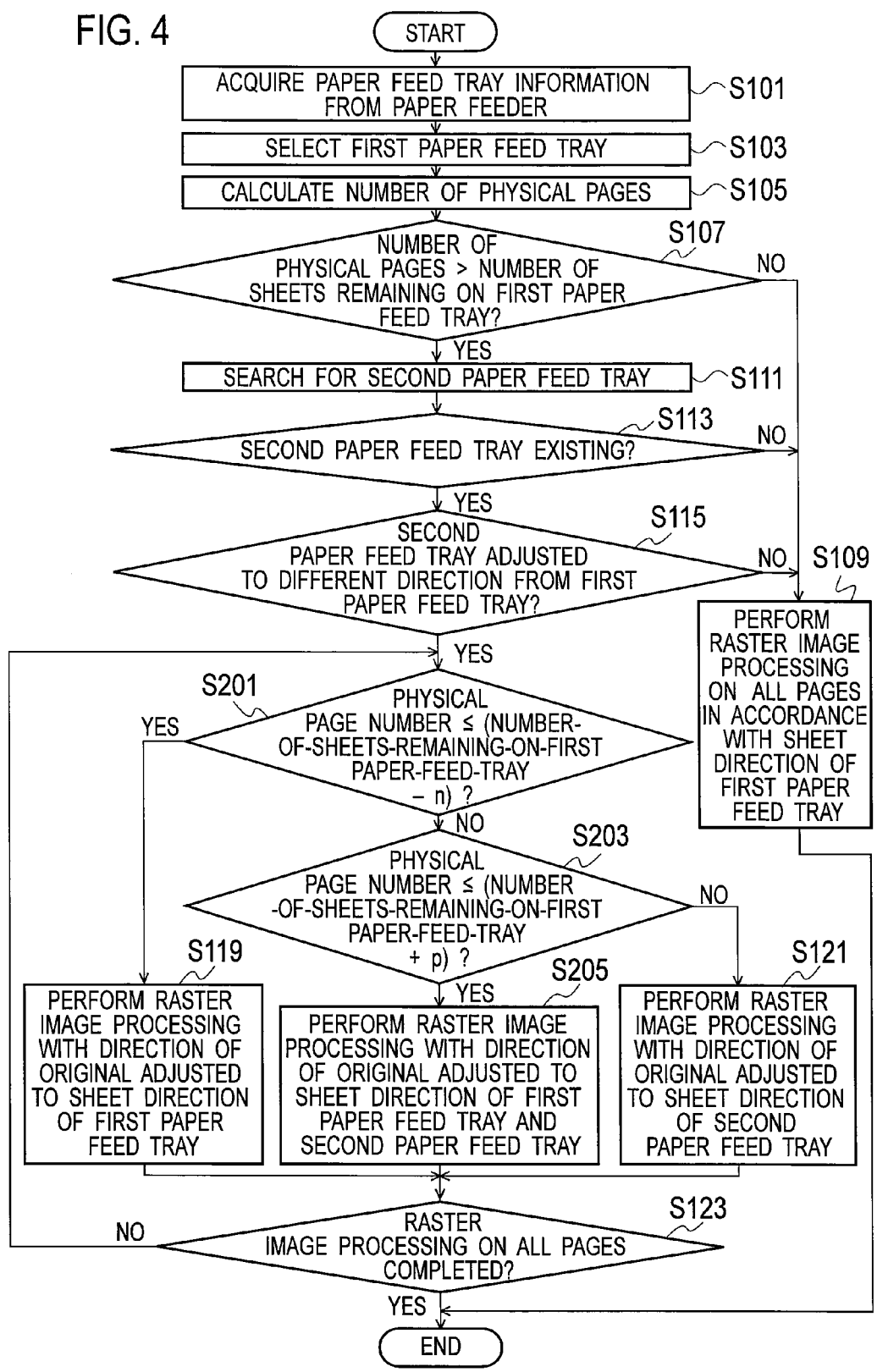
FIG. 4 is a flowchart illustrating the operation of an image data generator of a second embodiment of the image data generation device according to the present invention.

FIG. 4 is a flowchart illustrating the operation of the image data generator 11 of the second embodiment of the image data generation device according to the present invention. Here, the same step numbers are provided to the same processes in the operation of the image data generator 11 of the first embodiment illustrated in FIG. 2, with description thereof being omitted.

As illustrated in FIG. 4, the processes from acquiring paper feed tray information at step S101 to determining whether or not the sheet direction of the second paper feed tray is different from that of the first paper feed tray at step S115 are the same as those in the operation of the image data generator 11 of the first embodiment illustrated in FIG. 2.

When, in the image data generator 11 of the second embodiment, the sheet direction of the second paper feed tray is different from that of the first paper feed tray (YES at step S115), the raster image processor 11c of the second embodiment determines (step S201) whether or not the physical page number of the image data subjected to the raster image processing is not larger than (number-of-sheets-remaining-on-first-paper-feed-tray−n) until the raster image processing on all the pages in the print job is completed (NO at step S123).

The reason for comparing the physical page number of the image data with (number-of-sheets-remaining-on-first-paper-feed-tray−n) is because there is taken into account a case where accurate detection of the number of sheets remaining on the first paper feed tray has failed due to the limit in the precision of the paper feed tray sensors 15b1 to 15bm for detecting the number of remaining sheets, or there is taken into account an error of a predetermined number −n of sheets, considering sheet jam or the like, for the number of remaining sheets in the paper feed tray information acquired from the paper feeder 15 in the processing at step S101. Here, n is a natural number for which the user or the like may set an arbitrary value such as 1, 5, or 10, for example.

Here, when the physical page number of the image data is not larger than (number-of-sheets-remaining-on-first-paper-feed-tray−n) (YES at step S201), the raster image processor 11c performs the raster image processing with the direction of the original of the physical page number adjusted to the sheet direction of the first paper feed tray (step S119).

When, on the other hand, the physical page number of the image data is larger than (number-of-sheets-remaining-on-first-paper-feed-tray−n) (NO at step S201), the raster image processor 11c subsequently determines whether or not the physical page number-of-the-image-data is-not-larger-than (number-of-sheets-remaining-on-first-paper-feed-tray+p) (step S203).

The reason for comparing the physical page number of the image data with (number-of-sheets-remaining-on-first-paper-feed-tray+p) is the same as the reason for comparing-the-physical-page-number-with (number-of-sheets-remaining-on-first-paper-feed-tray−n) at step S201, in order to take into account an error of a predetermined number+p of sheets for the number of remaining sheets in the paper feed tray information acquired from the paper feeder 15 in the processing at step S101. Here, p is also a natural number, which may be equal to n, for which the user or the like may set an arbitrary value such as 1, 5, or 10, for example.

When the physical page number of the image data is not larger than (number-of-sheets-remaining-on-first-paper-feed-tray+p) (YES at step S203), the raster image processor 11c performs the raster image processing and generates image data with the direction of the original of the physical page number adjusted to the sheet directions of both the first paper feed tray and the second paper feed tray (step S205).

Accordingly, the raster image processing is performed for the image data to form the image data in both directions on the originals in the sheet directions of both the first paper feed tray and the second paper feed tray, i.e., both "horizontally (long-side feed)" and "vertically (short-side feed)", if the physical page number of the image data is in a predetermined range between −n to +p relative to the number of remaining sheets in the paper feed tray information acquired from the paper feeder 15 in the processing at step S101.

When, on the other hand, the physical page number of the image data has become larger than (number-of-sheets-remaining-on-first-paper-feed-tray+p) (NO at step S203), the raster image processor 11c performs the raster image processing and generates image data with the direction of the original of the physical page number adjusted to the sheet direction of the second paper feed tray (step S121).

Figure 5:
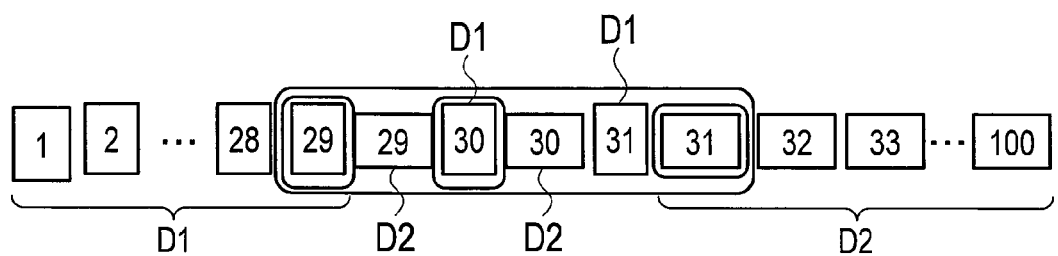
FIG. 5 illustrates a direction of image data generated by a raster image processing performed by the image data generator of the second embodiment of the image data generation device according to the present invention.

FIG. 5 is an explanatory drawing illustrating the direction of the image data after the raster image processing by the image data generator 11 of the second embodiment of the image data generation device according to the present invention.

Also in FIG. 5, similarly to the case of FIG. 3, the print job is for a 100-page original, for example, with the sheet size of the first paper feed tray being "A4", the sheet direction being "horizontal (long-side feed)", and the number of remaining sheets being 30, for example, and the sheet size of the second paper feed tray being "A4", the sheet direction being "vertical (short-side feed)", and the number of remaining sheets being 500.

In addition, it is assumed here that n=p=1, for example, has been preliminarily set.

Accordingly, the raster image processor 11c of the second embodiment performs, in the processing at step S305, the raster image processing of the print job and forms the image data D1 and the image data D2 in the sheet directions of both the first paper feed tray and the second paper feed tray, i.e., both "horizontally (long-side feed)" and "vertically (short-side feed)", for 30±1 sheets, i.e., from the 29-th to the 31-th sheet as illustrated in FIG. 5. In this case, the above mentioned number "30" is the number of remaining sheets in the paper feed tray information acquired from the paper feeder 15 in the processing at step S101.

It turns out that the originals from page 1 to page 28 are subjected to the raster image processing "horizontally (long-side feed)" which is the sheet direction of the first paper feed tray so that only the "horizontal (long-side feed)" image data D1 is generated as illustrated in FIG. 5, whereas the originals from page 32 to page 100 are subjected to the raster image processing "vertically (short-side feed)" which is the sheet direction of the second paper feed tray so that only the "vertical (short-side feed)" image data D2 is generated.

Therefore, according to the image data generator 11 of the second embodiment of the image data generation device according to the present invention, when there exists a second paper feed tray whose sheet direction is different from that of the first paper feed tray, the raster image processing is performed for a predetermined number (here, n+p) of sheets before and after a sheet corresponding to the number of remaining sheets indicated in the paper feed tray information detected from the first paper feed tray, so that both the image data D1 and the image data D2 are generated in accordance with sheet directions of both the first paper feed tray and the second paper feed tray.

As a result, decrease of printing speed can be prevented even when the number of sheets remaining on the first paper feed tray cannot be accurately detected, or when switching from the first paper feed tray to the second paper feed tray has occurred before and after a sheet corresponding to the number of remaining sheets indicated in the paper feed tray information detected from the first paper feed tray, due to occurrence of sheet jam or the like.

In other words, according to the image data generator 11 of the second embodiment of the image data generation device according to the present invention, taking, for example, a case where n=p=0, a search is performed to determine whether or not there exists a second paper feed tray having the same sheet size as that of the first paper feed tray and having a sheet direction different from that of the first paper feed tray when the number of print pages is larger than the number of sheets remaining on the first paper feed tray and, when there exists such a second paper feed tray, the following processes are performed until the raster image processing on all the pages in the print job is completed: (1) the raster image processing with the direction of the original of the physical page number adjusted to the sheet direction of the first paper feed tray when the physical page number of the image data generated by the raster image processing is not larger than the number of sheets remaining on the first paper feed tray, and (2) the raster image processing in accordance with the sheet direction of the second paper feed tray when the physical page number of the image data has become larger than the number of sheets remaining on the first paper feed tray. Accordingly, decrease of printing speed can be prevented even when the number of print pages is larger than the number of sheets remaining on the first paper feed tray specified in the print job and switching occurs after performing the raster image processing, the switching from the first paper feed tray to the second paper feed tray having a different sheet direction, because rotation of the generated image data becomes unnecessary when switching trays.

In addition, according to the image data generator 11 of the second embodiment of the image data generation device according to the present invention, taking, for example, a case where both n and p are not zero, the following processes are performed: (1) the raster image processing with the direction of the original of the physical page number adjusted to the sheet direction of the first paper feed tray, when the first physical page number of the image data generated by the raster image processing is not larger than a value obtained by subtracting a predetermined number of sheets from the number of sheets remaining on the first paper feed tray; (2) the raster image processing with the direction of the original of the physical page number adjusted to the sheet directions of the first paper feed tray and the second paper feed tray, when the physical page number ranges from a value obtained by subtracting a predetermined number of sheets from the number of sheets remaining on the first paper feed tray to a value obtained by adding a predetermined number to the number of sheets remaining on the first paper feed tray; and (3) the raster image processing in accordance with the sheet direction of the second paper feed tray, when the physical page number of the image data has become larger than a value obtained by adding a predetermined number to the number of sheets remaining on the first paper feed tray.

Therefore, even when there exists an error in the paper feed number of sheets included in the paper feed tray information of the first paper feed tray, decrease of printing speed can be prevented even in a case of continuing printing by switching to a paper feed tray having a different sheet direction, because there are image data in both vertical and horizontal directions for the predetermined number of sheets before and after a sheet corresponding to the number of sheets remaining on the first paper feed tray.

Figure 6:
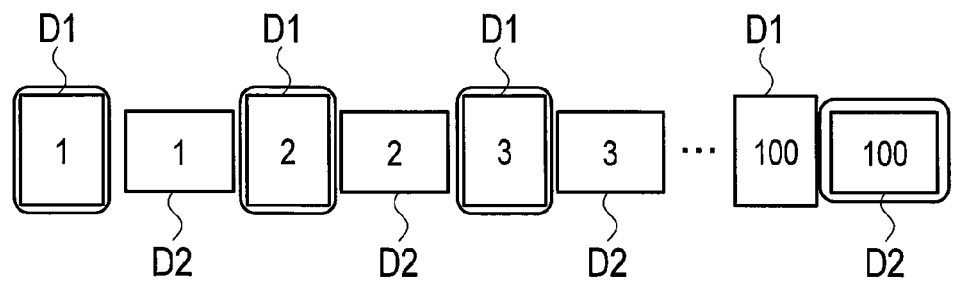
FIG. 6 illustrates another exemplary direction of image data generated by a raster image processing performed by the image data generator of the second embodiment of the image data generation device according to the present invention.

Although the aforementioned second embodiment has been described such that the raster image processing is performed for the predetermined number of sheets before and after a sheet corresponding to the number of sheets remaining on the first paper feed tray and such that the raster image processing is adjusted to the sheet directions of the first paper feed tray and the second paper feed tray, the present invention is not limited thereto and the raster image processing may be performed both vertically and horizontally on each original of the print job as illustrated in FIG. 6 so as to generate image data in both directions.

FIG. 6 illustrates another example of the direction of image data generated by the raster image processing by the image data generator 11 of the second embodiment of the image data generation device according to the present invention.

Also in FIG. 6, similarly to FIGS. 3 and 5, when the print job is a 100-page stack of original, for example, it turns out that both the "horizontal (long-side feed)" image data D1 and the "vertical (short-side feed)" image data D2 are generated for all the 100-page stack of originals. Both the "horizontal (long-side feed)" image data D1 and the "vertical (short-side feed)" image data D2 are generated at the timing during an idle time when the use rate of the CPU of the raster image processor 11c is low, i.e., not more than 20%, for example. In this manner, decrease of printing speed in the printing machine 1 can be reliably prevented because the image data of one of the directions can be selected to perform printing, regardless of which of the first paper feed tray or the second paper feed tray feeds paper, when performing printing of image data by the printing processor 14.

Third Embodiment

Next, the image data generator 11 of a third embodiment of the image data generation device according to the present invention will be described. The image data generator 11 of the third embodiment has the same configuration as that of the image data generator 11 of the first embodiment illustrated in FIG. 1, with only their operations being different, and therefore the operation of the third embodiment will be described referring to symbols of the image data generator 11 of the first embodiment illustrated in FIG. 1.

Figure 7:
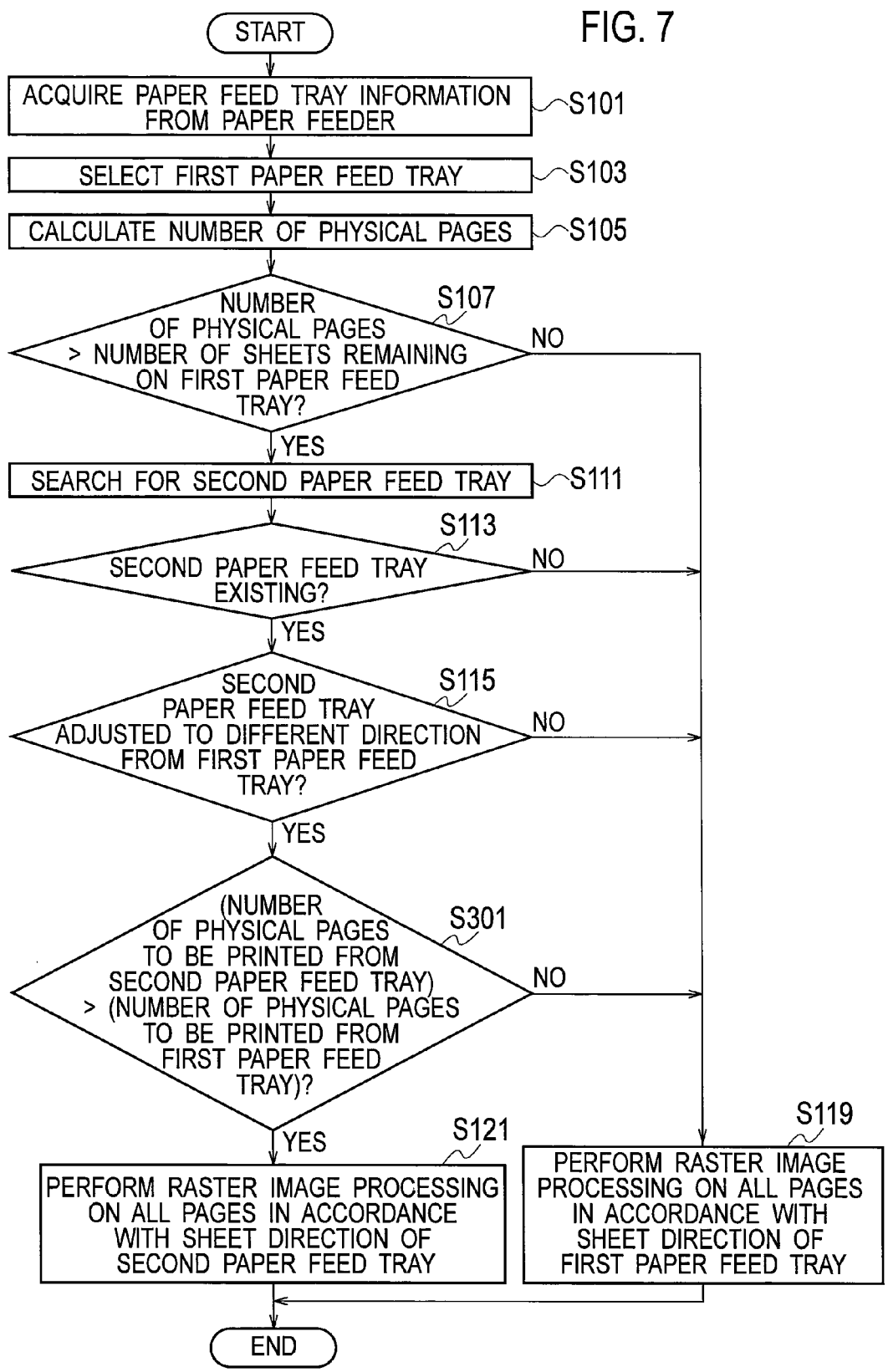
FIG. 7 is a flowchart illustrating the operation of an image data generator of a third embodiment of the image data generation device according to the present invention.

FIG. 7 is a flowchart illustrating the operation of the image data generator 11 of the third embodiment of the image data generation device according to the present invention. Here, the same step numbers are provided to the same processes in the operation of the image data generator 11 of the first embodiment illustrated in FIG. 2, and the explanation is omitted.

As illustrated in FIG. 7, the processes from acquiring paper feed tray information at step S101 to searching for the second paper feed tray at step S113 are the same as those in the operation of the image data generator 11 of the first embodiment illustrated in FIG. 2. However, when, at step S111 of the third embodiment, there is a plurality of second paper feed trays having the same sheet size as that of the first paper feed tray, the second paper feed tray with the largest number of remaining sheets is searched for.

When it is determined in the determination process at step S113 that there exists a second paper feed tray having sheets of the same size as that of the first paper feed tray stacked thereon in a different direction (YES), the raster image processor 11c determines whether or not the number of physical pages of the image data which can be subsequently printed from the first paper feed tray is smaller than the number of physical pages which can be subsequently printed from the second paper feed tray (step S301).

Here, when the number of physical pages which can be printed from the second paper feed tray is larger than the number of physical pages which can be printed from the first paper feed tray (YES at step S301), the possibility of running out of paper is lower for printing with the second paper feed tray than printing with the first paper feed tray.

Therefore, in such a case, the raster image processor 11c performs the raster image processing on all the pages in accordance with the sheet direction of the second paper feed tray with a lower possibility of running out of paper (step S121).

When, in contrast, the number of physical pages which can be printed from the second paper feed tray is not larger than the number of physical pages which can be printed from the first paper feed tray (NO at step S301), the possibility of running out of paper is lower for printing with the first paper feed tray than printing with the second paper feed tray.

Therefore, in such a case, the raster image processor 11c performs the raster image processing with all the pages adjusted to the sheet direction of the first paper feed tray (step S119).

When it is determined in the determination process at step S107 that the number of physical pages of the image data is not larger than the number of sheets remaining on the first paper feed tray (NO), and it is determined in the determination process at step S113 that there is no second paper feed tray (NO), the raster image processor 11c performs the raster image processing with all the pages adjusted to the sheet direction of the first paper feed tray, similarly to the case where the determination process at step S301 has determined NO (step S119).

Figure 8:
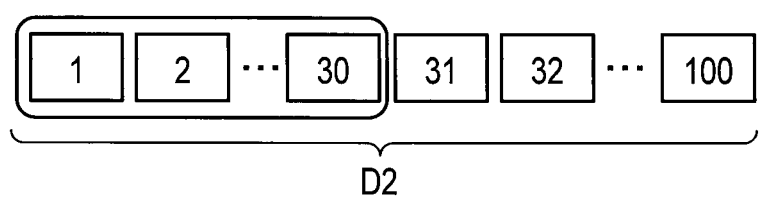
FIG. 8 illustrates a direction of image data generated by a raster image processing performed by the image data generator of the third embodiment of the image data generation device according to the present invention.

FIG. 8 is an explanatory drawing illustrating the direction of the image data after the raster image processing by the image data generator 11 of the third embodiment of the image data generation device according to the present invention.

Also in FIG. 8, similarly to the cases of FIGS. 3 and 5, the print job is for a 100-page original, for example, with the sheet size of the first paper feed tray being "A4", the sheet direction being "horizontal (long-side feed)", and the number of remaining sheets being 30, for example, and the sheet size of the second paper feed tray being "A4", the sheet direction being "vertical (short-side feed)", and the number of remaining sheets being 500.

Under the aforementioned conditions, therefore, the image data generator 11 of the third embodiment determines YES at step S107 since the number "100" of physical pages of the image data is larger than the number "30" of sheets remaining on the first paper feed tray; searches for a second paper feed tray at the subsequent step S111; and since there exists a second paper feed tray, the second paper feed tray with a larger number of remaining sheets and a larger number of physical pages than the first paper feed tray, determines YES at step S301; and performs the raster image processing on a 100-page stack of originals using the "vertical (short-side feed)" second paper feed tray, as illustrated in FIG. 5, so that the "vertical (short-side feed)" image data D2 is generated.

Therefore, when, according to the image data generator 11 of the third embodiment of the image data generation device according to the present invention, the number of physical pages of the image data exceeds the number of sheets remaining on the first paper feed tray, a second paper feed tray is searched for, and image data is generated by the raster image processing in accordance with the sheet direction of the first paper feed tray or the second paper feed tray having stacked thereon the largest number of sheets of the same sheet size as that of the first paper feed tray. Accordingly, there will be fewer occasions of printing after switching to a paper feed tray having a different sheet direction during printing in the image data generator 11, whereby decrease of printing speed can be prevented.

Fourth Embodiment

Next, the image data generator 11 of a fourth embodiment of the image data generation device according to the present invention will be described.

<Configuration of Printing Machine 1 Having Image Data Generator 11>

Figure 9:
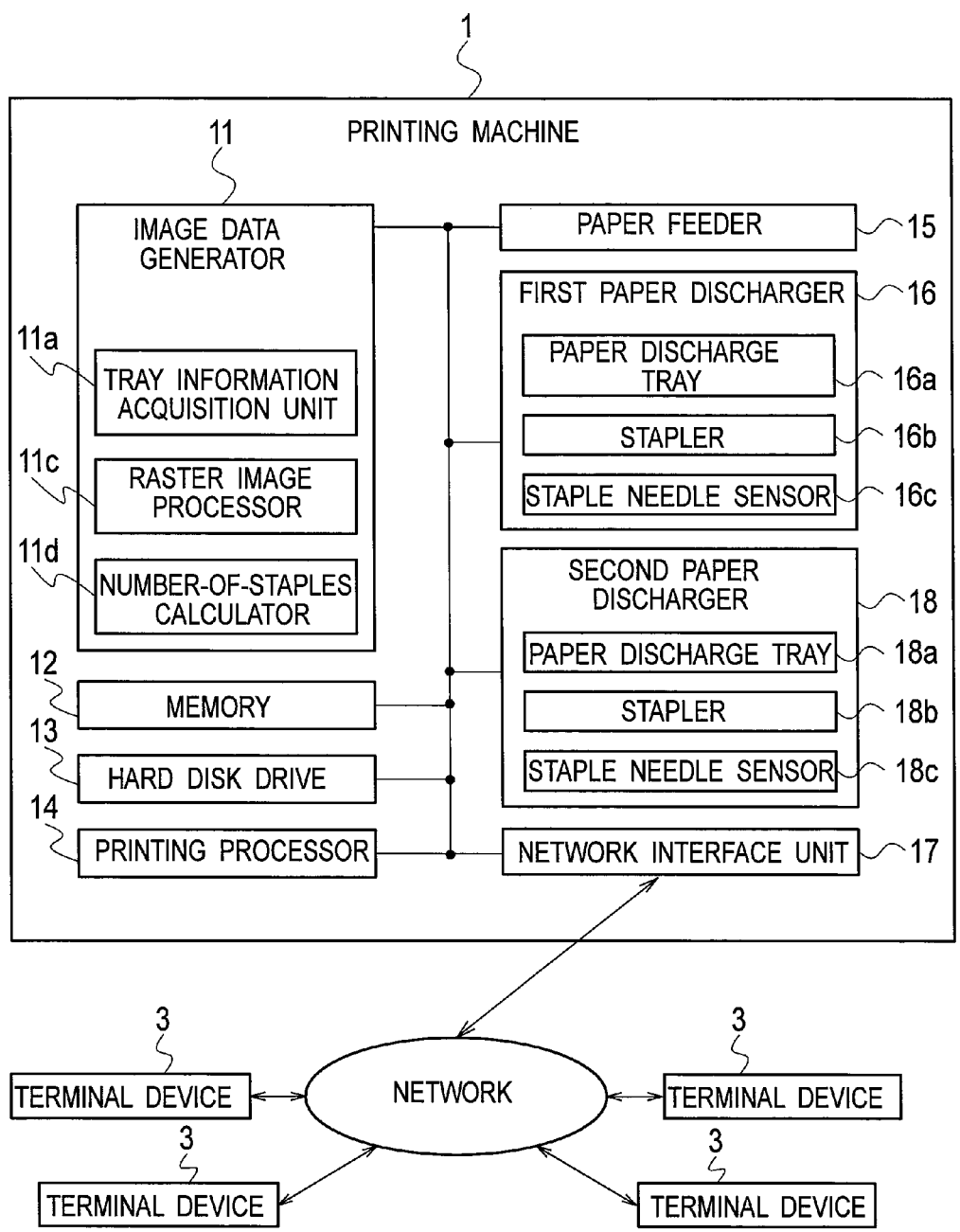
FIG. 9 is a block diagram illustrating an exemplary configuration and connection to a terminal device, of a printing machine having an image data generator of a fourth embodiment of the image data generation device according to the present invention.

FIG. 9 is a block diagram illustrating an exemplary configuration and connection to a terminal device 3, of a printing machine 1 having an image data generator 11 of a fourth embodiment of the image data generation device according to the present invention.

As illustrated in FIG. 9, the printing machine 1 having the image data generator 11 of the fourth embodiment of the image data generation device according to the present invention is connected to terminal devices 3, 3, . . . of respective users via a network 2 such as an intra-company network.

The printing machine 1 has the image data generator 11, a memory 12, a hard disk drive 13, a printing processor 14, a paper feeder 15, a first paper discharger 16, a network interface unit 17, and a second paper discharger 18.

The image data generator 11, which includes a CPU (not illustrated) and the like, executes a program such as a printer driver stored in the hard disk drive 13 so as to function as a tray information acquisition unit 11a, a number-of-staples calculator 11d (number-of-consumables-used calculator), and a raster image processor 11c according to the present invention, and generate image data for printing based on a print job which has been transmitted from the terminal device 3 or the like.

The memory 12, the hard disk drive 13, the printing processor 14, the paper feeder 15, and the network interface unit 17 are the same components as those included in the image data generator 11 of the first embodiment illustrated in FIG. 1 and respectively having the same reference numerals and therefore explanation thereof will be omitted.

The first paper discharger 16, having a paper discharge tray 16a configured to stack printed and discharged sheets thereon, a stapler 16b mounted on the paper discharge tray 16a, and a staple needle sensor 16c configured to detect the number of staple needles remaining in the stapler. 16b, performs stapling, by the stapler 16b using consumable staple needles, with a plurality of sheets discharged on the paper discharge tray 16a as one set.

Similarly to the first paper discharger 16, the second paper discharger 18, also having a paper discharge tray 18a configured to stack printed and discharged sheets thereon, a stapler 18b mounted on the paper discharge tray 18a, and a staple needle sensor 18c configured to detect the number of staple needles remaining in the stapler 18b, performs stapling, by the stapler 18b using consumable staple needles, with a plurality of sheets discharged on the paper discharge tray 18a as one set.

The terminal device 3, which is a PC or the like configured to perform a variety of information processing, transmits print jobs to the printing machine 1 via the network 2.

<Operation of Image Data Generator 11 of Fourth Embodiment>

Next, an operation of the image data generator 11 of the fourth embodiment of the image data generation device according to the present invention configured as above will be described, referring to the drawings.

Figure 10A:
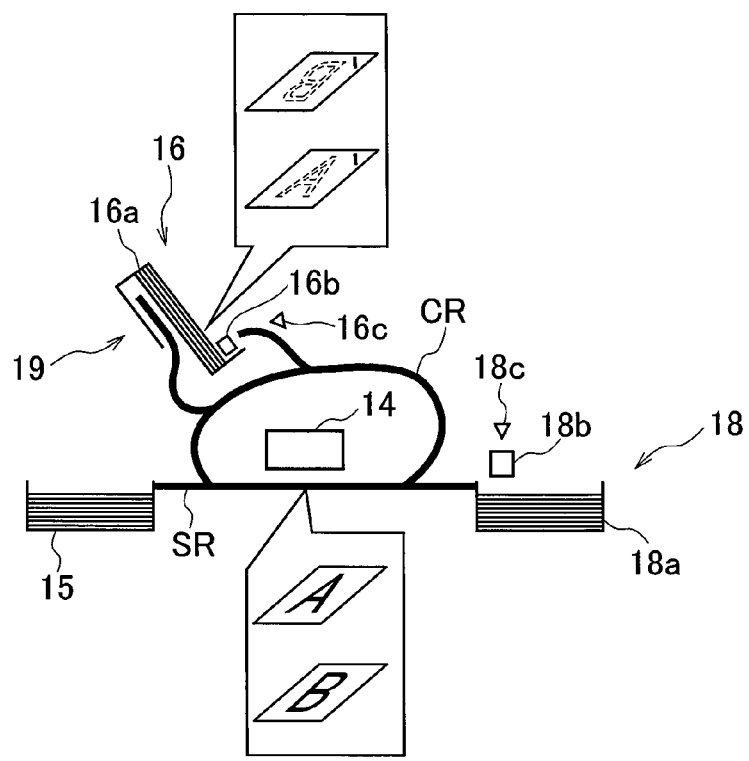
FIG. 10A is an explanatory diagram illustrating an operation of the image data generator of the fourth embodiment of the image data generation device according to the present invention.
Figure 10B:
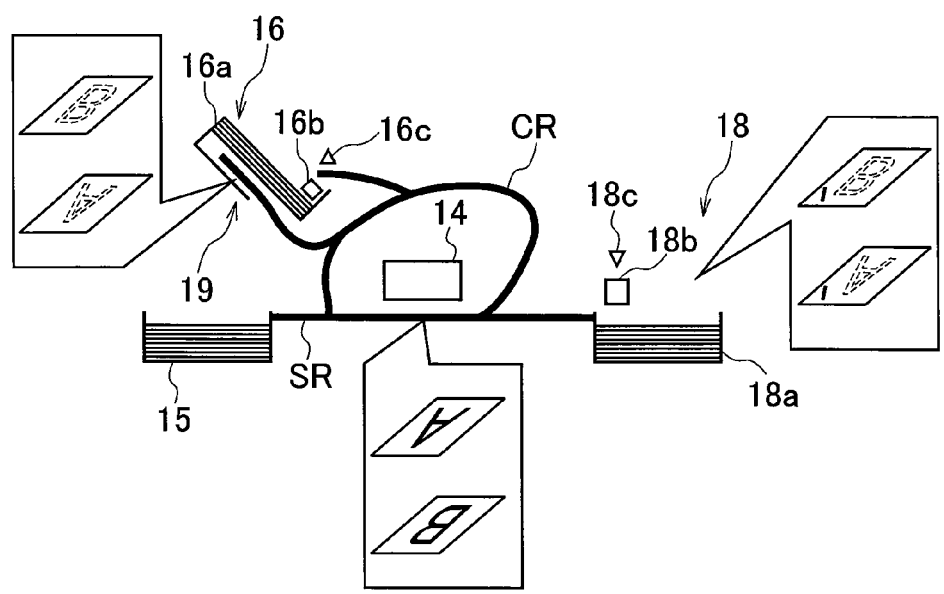
FIG. 10B is an explanatory diagram illustrating an operation of the image data generator of the fourth embodiment of the image data generation device according to the present invention.

FIGS. 10A and 10B are explanatory diagrams schematically illustrating an operation of the image data generator 11 of the fourth embodiment of the image data generation device according to the present invention. FIG. 10A illustrates sheets being transferred along a transfer path in the printing machine 1 to be discharged on the paper discharge tray 16a and stapled by the stapler 16b, and FIG. 10B illustrates sheets being transferred along a transfer path in the printing machine 1 to be discharged on the paper discharge tray 18a and stapled by the stapler 18b. Here, description is provided taking, for example, a case where a character "A" is printed on the surface of a first sheet and a character "B" is printed on the surface of a second sheet, based on a print job, and the two sheets in total are stapled at the top left corner.

As illustrated in FIG. 10A, the printing machine 1 has the paper feeder 15, the printing processor 14, the first paper discharger 16, the second paper discharger 18, and a reversing unit 19.

The paper feeder 15, which is provided with a paper feed tray having sheets stacked thereon, transfers sheets from the paper feed tray to a paper feed transfer path SR and subsequently to a circulating transfer path CR. There exists a junction point where a transfer path of a sheet being fed joins a path for circulatively transferring a sheet which has been circulatively transferred in the machine after being printed on the surface and reversed at the reversing unit 19. Based on the junction point, the path on the paper feed tray side is referred to as the paper feed transfer path SR, and the path on which a sheet is circulated in the printing machine 1 is referred to as the circulating transfer path CR.

The printing processor 14 has a line-type ink-jet head and performs printing on sheets line by line by discharging ink on the sheets being transferred along the circulating transfer path CR located immediately under the ink-jet heads. The sheets printed by the printing processor 14 are transferred along the circulating transfer path CR in the housing by a transfer roller and the like which are arranged on the circulating transfer path CR, and discharged on the first paper discharger 16 or the second paper discharger 18.

The reversing unit 19 reverses the front and back of a sheet transferred along the circulating transfer path CR, and recirculates it along the circulating transfer path CR.

The first paper discharger 16 has the tray-shaped paper discharge tray 16a protruding from the housing of the printing machine 1, and the stapler 16b provided at a position upstream in the sheet transfer direction on the paper discharge tray 16a, the position being at the far side in the drawing, to perform stapling with a plurality of sheets transferred on the paper discharge tray 16a as one set. In addition, as described above, the staple needle sensor 16c detects the number of staple needles remaining in the stapler 16b.

The second paper discharger 18 has the tray-shaped paper discharge tray 18a protruding from the housing of the printing machine 1, and the stapler 18b provided at a position upstream in the sheet transfer direction on the paper discharge tray 18a, the position being at the front side in the drawing, to perform stapling with a plurality of sheets transferred on the paper discharge tray 18a as one set. In addition, as described above, the staple needle sensor 18c detects the number of staple needles remaining in the stapler 18b.

In FIG. 10A, sheets are first transferred from the paper feeder 15 along the paper feed transfer path SR, then transferred along the circulating transfer path CR, and printed by the printing processor 14, based on the print job. Here, the number of sheets is two, a character "A" is printed on the surface of the first sheet, and a character "B" is printed on the surface of the second sheet.

Subsequently, the printed sheets are further transferred along the circulating transfer path CR, and discharged on the first paper discharger 16. On this occasion, the sheets are discharged on the paper discharge tray 16a with the printed surface facing down, and the stapler 16b staples the discharged sheets at a position upstream in the sheet transfer direction and also at the top (apex) of the sheets, as illustrated in FIG. 10A. Accordingly, it is possible to staple the sheets at the top left corner.

In FIG. 10B, sheets are first transferred from the paper feeder 15 along the paper feed transfer path SR, then transferred along the circulating transfer path CR, and printed by the printing processor 14, based on the print job. Here, the number of sheets is two, a character "A" is printed on the surface of the first sheet, and a character "B" is printed on the surface of the second sheet.

Subsequently, the printed sheets are further transferred along the circulating transfer path CR, reversed upside down by the reversing unit 19, and discharged on the second paper discharger 18. On this occasion, printing in the same direction as the direction of the image illustrated in FIG. 10A without rotating the image to be printed by the printing processor 14 causes the sheets discharged on the second paper discharger 18 to be stapled at the right bottom corner.

Therefore, in order to staple the sheets discharged on the second paper discharger 18 at the top left corner, it is necessary to rotate the images "A" and "B" to be printed by 180°, as illustrated in FIG. 10B.

Accordingly, the sheets having the image rotated by 180° printed thereon are further transferred along the circulating transfer path CR, and reversed upside down by the reversing unit 19. Subsequently, the sheets are transferred along the circulating transfer path CR and discharged on the second paper discharger 18. On this occasion, the sheets are discharged on the paper discharge tray 18a with the printed surface facing down, and the stapler 18b staples the discharged sheets at a position upstream in the sheet transfer direction and also at the top (apex) of the sheets, as illustrated in FIG. 10B. Accordingly, it is possible to staple the sheets at the top left corner.

Figure 11:
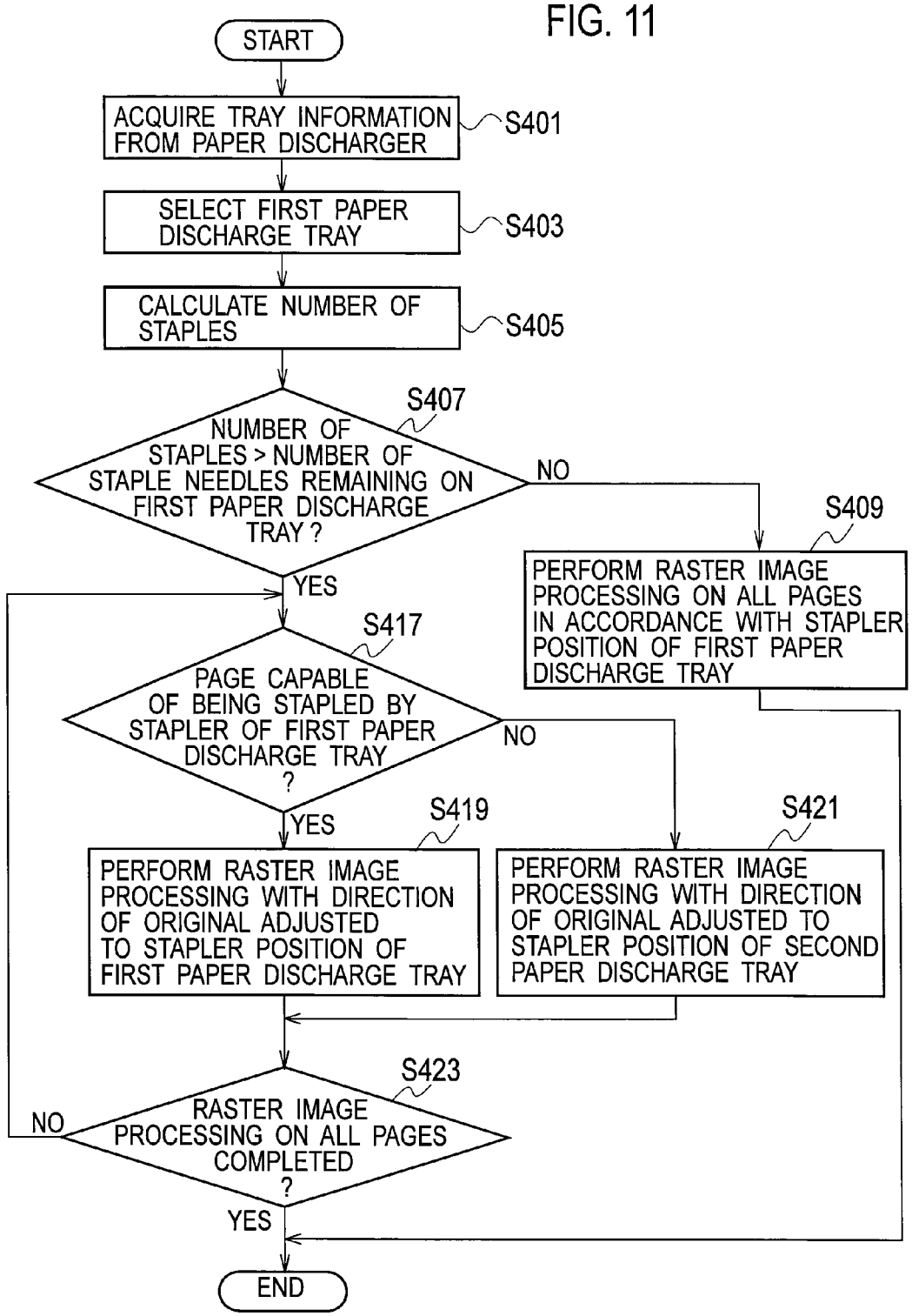
FIG. 11 is a flowchart illustrating the operation of the image data generator of the fourth embodiment of the image data generation device according to the present invention.

FIG. 11 is a flowchart illustrating the operation of the image data generator 11 of the fourth embodiment of the image data generation device according to the present invention.

First, upon receiving a print job from a certain terminal device 3 via the network 2, for example, the printing machine 1 starts operating, and the tray information acquisition unit 11a of the image data generator 11 first acquires paper discharge tray information (tray information) from the first paper discharger 16 and the second paper discharger 18 (step S401).

With the paper discharge tray information including information such as the stapling position (status), the amount of remaining staple needles and the like, the paper discharge tray information (tray information) of the paper discharge tray 16a is acquired from the staple needle sensor 16c of the first paper discharger 16, and the paper discharge tray information (tray information) of the paper discharge tray 18a is acquired from the staple needle sensor 18c of the second paper discharger 18. However, the paper discharge tray information may be preliminarily stored in, and subsequently acquired from, the memory 12 or the like. The status includes the stapling position. The information of the stapling position may be omitted provided that the stapling position is always fixed at the upstream in the sheet transfer direction on the paper discharge tray 16a.

Next, the raster image processor 11c of the image data generator 11 selects, from the paper discharge trays 16a and 18a, the first paper discharge tray, which is the paper discharge tray specified by the print job (step S403), and subsequently the number-of-staples calculator 11d of the image data generator 11 calculates the number of staples from the print job received from the terminal device 3 (step S405). Here, the number of staples refers to the number of staple needles to be used by the stapler.

Next, the raster image processor 11c of the image data generator 11 determines whether or not the number of staples is larger than the amount of staple needles remaining on the first paper discharge tray (step S407) and, when it is determined that the number of staples is equal to or smaller than the amount of staple needles remaining on the first paper discharge tray (NO, at step S407), the raster image processor 11c performs raster image processing in accordance with a direction that allows all the pages in the print job to be stapled on the first paper discharge tray, and generates image data (step S409). Specifically, the raster image processor 11c generates image data so as to be printed without rotating the image as illustrated in FIG. 10A when the first paper discharge tray is the paper discharge tray 16a, whereas the raster image processor 11c generates image data so as to be printed with the image being rotated by 180° as illustrated in FIG. 10B when the first paper discharge tray is the paper discharge tray 18a.

When, in contrast, it is determined that the number of staples is larger than the amount of staple needles remaining on the first paper discharge tray (YES at step S407), the raster image processor 11c further determines, while raster image processing on all the pages of print job is not completed (NO at step S423), whether or not a page of a physical page number in the image data subjected to raster image processing is a page which can be stapled by the stapler of the first paper discharge tray (step S417), based on the number of staple needles remaining in of the first paper discharge tray.

Here, when the page of the physical page number in the image data subjected to raster image processing is a page which can be stapled by the stapler of the first paper discharge tray (YES at step S417), it turns out that there are staple needles remaining in the stapler of the first paper discharge tray and the page of the physical page number in the image data can be stapled on the first paper discharge tray specified by the user in the print job, and therefore the raster image processor 11c performs raster image processing to generate image data with the direction of the original having the physical page number adjusted to the direction that allows stapling on the first paper discharge tray (step S419).

When, on the other hand, the page of the physical page number in the image data subjected to raster image processing is a page which cannot be stapled by the stapler of the first paper discharge tray (NO at step S417), it turns out that there is no staple needle remaining in the stapler of the first paper discharge tray and the page of the physical page number in the image data cannot be stapled on the first paper discharge tray specified by the user in the print job. In such a case, therefore, the raster image processor 11c performs raster image processing with the direction of the originals having the physical page number and subsequent numbers adjusted to the sheet direction of the second paper feed tray (step S421).

Subsequently, when raster image processing on all the pages in the print job is completed (YES at step S123), the raster image processor 11c terminates the aforementioned process.

Therefore, according to the image data generator 11 of the fourth embodiment of the image data generation device according to the present invention, the raster image processor 11c performs raster image processing in the sheet direction of the first paper discharge tray and generates image data when the number of staples is larger than the number of staple needles remaining on the first paper discharge tray, and thereafter, performs raster image processing in a direction that allows stapling on the second paper feed tray and generates image data.

Accordingly, when, after raster image processing, the number of staples is larger than the number of staple needles remaining on the first paper discharge tray and printing is performed by switching from the first paper discharge tray to a second paper discharge tray with a different stapling position, rotation of image data becomes unnecessary when switching trays, whereby decrease of printing speed can be prevented.

Fifth Embodiment

Next, the image data generator 11 of a fifth embodiment of the image data generation device according to the present invention will be described. The image data generator 11 of the fifth embodiment has the same configuration as that of the image data generator 11 of the fourth embodiment illustrated in FIG. 9, with only their operations being different, and therefore the operation of the fifth embodiment will be described referring to symbols of the image data generator 11 of the fourth embodiment illustrated in FIG. 9.

FIG. 12 is a flowchart illustrating the operation of the image data generator 11 of the fifth embodiment of the image data generation device according to the present invention. Here, the same step numbers are provided to the same processes in the operation of the image data generator 11 of the fourth embodiment illustrated in FIG. 11, and the explanation is omitted.

As illustrated in FIG. 12, the processes from acquiring paper discharge tray information at step S401 to step S423 are the same as those in the operation of the image data generator 11 of the fourth embodiment illustrated in FIG. 11.

When it is determined in the determination process at step S423 that raster image processing on all the pages in the print job is completed (YES), the raster image processor 11c determines whether or not a print job to be performed next exists in the memory 12 (at step S503).

When it is determined that there exists a print job to be performed next in the memory 12 (YES at step S503), the number-of-staples calculator 11d calculates a new number of remaining staple needles by subtracting the number of staple needles used in the print job performed this time from the current number of remaining staple needles (at step S505).

Subsequently, the number-of-staples calculator 11d acquires a print job to be performed next from the memory 12 (at step S507).

Therefore, according to the image data generator 11 of the fifth embodiment of the image data generation device according to the present invention, the number of remaining staple needles is calculated by subtracting the number of staple needles used, whereby the next processing can be performed bypassing the process of acquiring tray information, which may result in a shortened processing time.

Although the aforementioned embodiments have been described such that, the image data generator 11 according to the present invention is provided in the printing machine 1, the present invention is not limited thereto and it may be provided in the terminal device 3 such as a PC configured to generate print jobs, or may be provided in another device (not illustrated) dedicated for the raster image processing, separately from the printing machine 1 and the terminal device 3.

The present invention is not limited to the aforementioned embodiments as they are, but may be implemented by modifying, at the stage of practice, the components without deviating from the scope thereof. In addition, the present invention may be implemented in various forms by combining, as appropriate, a plurality of components disclosed in the aforementioned embodiments. For example, one or more components may be deleted from all the components illustrated in the embodiments.

In addition, each of the functions and processes described above may be implemented by one or more processing circuits, for example. Included in the processing circuits are: a programmed processor, an electric circuit or the like, and further, a device such as an application specific integrated circuit (ASIC), or circuit elements arranged to perform the functions described above.

This application claims priority based on Japanese Patent Application No. 2015-053294 (filed on Mar. 17, 2015) and priority based on Japanese Patent Application No. 2016-020887 (filed on Feb. 5, 2016), the entire contents of which are incorporated herein by reference.

INDUSTRIAL APPLICABILITY

According to the image data generation device according to the present invention, image data is generated by determining the direction of the image data based on tray information and the number of consumables used, and performing raster image processing in the determined direction, whereby decrease of printing speed can be prevented even when paper feed trays and paper discharge trays are switched during printing to continue printing in a printing machine.

REFERENCE SIGNS LIST

1 printing machine
2 network
3 terminal device
11 image data generator (image data generation device)
11a tray information acquisition unit
11b number-of-pages calculator (number-of-consumables-used calculator)
11c raster image processor
11d number-of-staples calculator (number-of-consumables-used calculator)
12 memory
13 hard disk drive
14 printing processor
15 paper feeder
15a1-15am paper feed tray
15b1-15bm paper feed tray sensor
16 paper discharger (first paper discharger)
17 network interface unit
18 second paper discharger

What is claimed is:

1. An image data generation device that generates image data based on a print job, comprising:
    a processor; and
    a memory including instructions that, when executed by the processor, cause the processor to perform operations including:
    acquiring, as tray information, a size and a direction of sheets stacked on a plurality of paper feed trays of a printing machine, and a number of remaining sheets;
    calculating, based on the print job, a number of print pages of the image data as a number of consumables used; and
    determining a tray to be used and a direction of the image data based on the tray information and the number of consumables used, and generating the image data by performing a raster image processing in the determined direction, wherein
    on the basis of the tray information of a first paper feed tray specified in the print job from the tray information and the number of print pages,
    the processor
        when the number of print pages is not larger than the number of sheets remaining on the first paper feed tray,
        generates the image data by
            performing the raster image processing on all the print pages in the print job in a sheet direction of the first paper feed tray, and
    the processor
        when the number of print pages is larger than the number of sheets remaining on the first paper feed tray,
        generates the image data by
            performing a search to determine whether or not there exists a second paper feed tray having a same sheet size as that of the first paper feed tray and having a different sheet direction from that of the first paper feed tray, and
        when there exists the second paper feed tray, performing, until the raster image processing on all the pages in the print job is completed, (1) the raster image processing, when a physical page number of the image data generated by the raster image processing is not larger than the number of sheets remaining on the first paper feed tray, with a direction of an original of the physical page number adjusted to the sheet direction of the first paper feed tray, and (2) the raster image processing in accordance with a sheet direction of the second paper feed tray when the physical page number of the image data has become larger than the number of sheets remaining on the first paper feed tray.

2. An image data generation device that generates image data based on a print job, comprising:

a processor; and a memory including instructions that, when executed by the processor, cause the processor to perform operations including:

acquiring, as tray information, a size and a direction of sheets stacked on a plurality of paper feed trays of a printing machine, and a number of remaining sheets;

calculating, based on the print job, a number of print pages of the image data as a number of consumables used; and determining a tray to be used and a direction of the image data based on the tray information and the number of consumables used, and generating the image data by performing a raster image processing in the determined direction, wherein on the basis of the tray information of a first paper feed tray specified in the print job from the tray information and the number of print pages, the processor when the number of print pages is not larger than the number of sheets remaining on the first paper feed tray, generates the image data by performing the raster image processing on all the print pages in the print job in a sheet direction of the first paper feed tray, and the processor when the number of print pages is larger than the number of sheets remaining on the first paper feed tray, generates the image data by performing a search to determine whether or not there exists a second paper feed tray having a same sheet size as that of the first paper feed tray and having a different sheet direction from that of the first paper feed tray, and when there exists the second paper feed tray, performing, until the raster image processing on all the pages in the print job is completed, (1) the raster image processing, when a physical page number of the image data generated by the raster image processing is not larger than a value obtained by subtracting a predetermined number of sheets from the number of sheets remaining on the first paper feed tray, with a direction of an original of the physical page number adjusted to the sheet direction of the first paper feed tray, (2) the raster image processing with the direction of the original of the physical page number adjusted to the sheet directions of the first paper feed tray and the second paper feed tray, when the physical page number of the image data ranges from a value obtained by subtracting a predetermined number of sheets from the number of sheets remaining on the first paper feed tray to a value obtained by adding a predetermined number of sheets to the number of sheets remaining on the first paper feed tray, and (3) the raster image processing in accordance with the sheet direction of the second paper feed tray, when the physical page number of the image data has become larger than a value obtained by adding a predetermined number of sheets to the number of sheets remaining on the first paper feed tray.

3. An image data generation device that generates image data based on a print job, comprising:

a processor; and a memory including instructions that, when executed by the processor, cause the processor to perform operations including:

acquiring, as tray information, a size and a direction of sheets stacked on a plurality of paper feed trays of a printing machine, stapling positions of staplers used in a plurality of paper discharge trays of the printing machine, a number of remaining sheets, and a number of remaining staple needles;

calculating, based on the print job, a number of print pages of the image data and a number of staples to be stapled, as a number of consumables used; and determining a tray to be used and a direction of the image data based on the tray information and the number of consumables used, and generating the image data by performing a raster image processing in the determined direction.

4. The image data generation device according to claim 3, further comprising:

a first paper discharge tray having provided thereon a first stapler that performs stapling at a first stapling position; and a second paper discharge tray having provided thereon a second stapler that performs stapling at a second stapling position which is different from the first stapling position, wherein the processor determines the direction of the image data to be the direction in which stapling is performed on the second paper discharge tray, when the calculated number of staples required for performing stapling at the first stapling position in the print job is equal to or larger than the number of remaining staple needles at the first stapling position, and smaller than the number of remaining staple needles at the second stapling position, and determines the direction of the image data to be the direction in which stapling is performed on the first paper discharge tray, when the calculated number of staples required for performing stapling at the second stapling position in the print job is equal to or larger than the number of remaining staple needles at the second stapling position, and smaller than the number of remaining staple needles at the first stapling position.

* * * * *